June 19, 1962 W. E. LAWMAN 3,039,796
ELECTRIC CABLE GLANDS HAVING A SOFT LINER
Filed Feb. 25, 1959 2 Sheets-Sheet 1

INVENTOR
William Edward Lawman
BY
ATTORNEYS

June 19, 1962 W. E. LAWMAN 3,039,796
ELECTRIC CABLE GLANDS HAVING A SOFT LINER
Filed Feb. 25, 1959 2 Sheets-Sheet 2
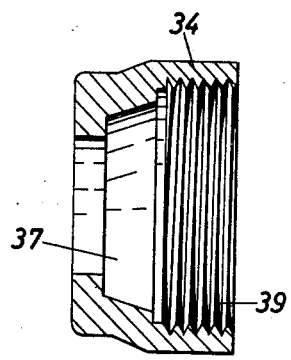
— FIG. 4.—
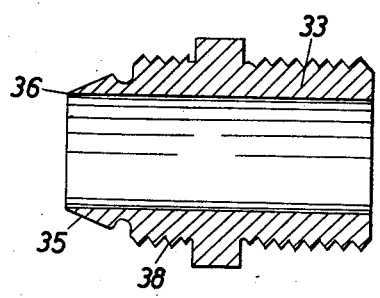
— FIG. 5.—
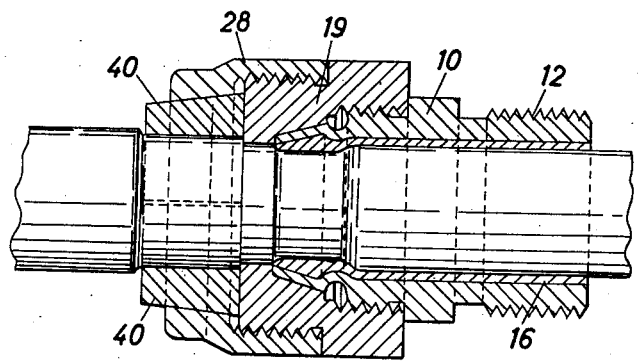
— FIG. 6.—
INVENTOR
William Edward Lawman
BY
ATTORNEYS United States Patent Office 3,039,796
Patented June 19, 1962

3,039,796
ELECTRIC CABLE GLANDS HAVING A SOFT LINER
William Edward Lawman, Newcastle Upon Tyne, England, assignor to British Engines Limited, Newcastle Upon Tyne, England, a British company
Filed Feb. 25, 1959, Ser. No. 795,449
Claims priority, application Great Britain Sept. 26, 1958
1 Claim. (Cl. 285—343)

According to one feature of the present invention there is provided a gland for use with electric cables comprising two members adapted to be secured together one within the other, the inner of said members having, as an integral part of it, a continuous sleeve which is formed externally with a circumferential groove to reduce its diameter locally to a material extent and beyond said groove is formed with an externally tapered portion having a plane surface, the outer of said members having internally a tapered part with a plane surface which by the action of securing the two members together acts on the tapered part of the inner member so that it is contracted onto a sheath of the cable.

The expression "plane surface" is intended to mean a surface without a screw thread and is not intended to preclude the surface of the tapered portion of the inner and/or outer members being knurled or otherwise roughened.

According to a further feature of the present invention there is provided a gland for use with electric cables comprising two members adapted to be secured together one within the other the inner of said members having, as an integral part of it, a continuous sleeve which is formed externally with a circumferential groove to reduce its diameter locally to a material extent and beyond said groove is formed with an externally tapered portion having a plane surface, the outer of said members having internally a tapered part with a plane surface which by the action of securing the two members together acts on the tapered part of the inner member so that it is contracted onto the sheath of the cable, the inner of said members having a lining of soft material e.g. lead.

According to a further feature of the present invention there is provided a gland for use with electric cables, comprising two members adapted to be secured together one within the other, wherein the inner of said members is provided with a lining of soft or readily fusible material or metal (e.g. lead) which by the action of securing the two members together is crimped, bent, contracted or otherwise deformed so as to cause said lining to bite onto or grip a cable passing through the gland.

An advantage of the lead lining is that it can be bored on site to fit the particular cable size to which the gland is being applied. This avoids the necessity of keeping in stock a large number of cable glands of different sizes in order to suit the large number of cable sizes available.

Some particular embodiments of the invention will now be described by way of example with reference to the accompanying drawings whereon:

FIGURES 4 and 5 show, in sectional elevation, two elements which may be used in combination to provide a further form of gland according to the invention, and FIGURE 6 shows, in sectional elevation, a modification of the gland shown in FIGURES 1, 2 and 3.

Figure 1:
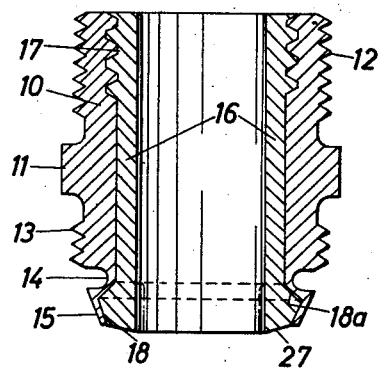
FIGURES 1 and 2 show, in sectional elevation, two elements or members adapted to be used in combination to provide one form of gland according to the invention.
Figure 2:
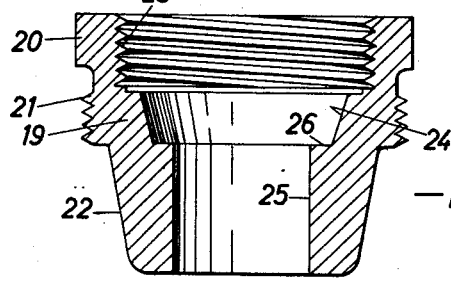
Figure 3:
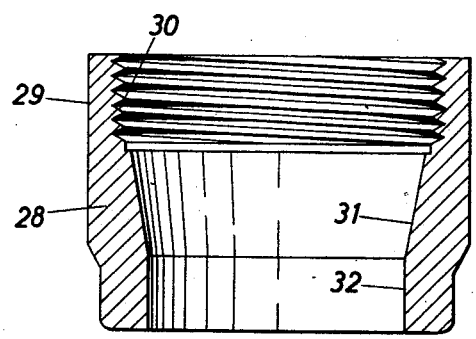
FIGURE 3 shows a third element or member which may be used in conjunction with the combination shown in FIGURES 1 and 2 where the gland is to be applied to an armoured cable.

Referring first to the embodiment of the invention shown in FIGURES 1, 2 and 3 this comprises an inner member 10 (see FIGURE 1) of tubular form having a hexagonal flange 11 intermediate its inner and outer ends. The member 10 is screw threaded as indicated at 12 so that it may be screwed into the wall of a casing, for example, housing electrical apparatus to which the conductors of the cable are to be connected, the gland providing a watertight entry into said casing for the cable.

The member 10 is also screw threaded externally as indicated at 13, for a part of its length, after which the outer diameter is reduced considerably and locally at 14 and then formed with a tapered face 15.

The inner member 10 has a lining of lead 16 which may be keyed in position by expanding it into a truncated screw thread 17 and into an undercut part 18, 18a of the member 10. Additionally or alternatively the lining 16 may be fused to the member 10.

The outer member 19 of the gland (see FIGURE 2) has a hexagonal flange 20 at its inner end. Beyond this hexagonal flange it is screw threaded externally for the portion of its length as indicated at 21, after which it tapers externally at 22 to its outer end. The tapered part 22 may be knurled or otherwise roughened. The bore of the outer member 19 is screw threaded at its inner end as indicated at 23, so as to screw onto the thread 13 of the member 10, after which it tapers inwardly as indicated at 24 to a cylindrical bore 25. The diameter of the latter is substantially the same as the internal diameter of the lining 16 of the part 10. It will be noted that a shoulder is formed at 26 in the member 19. This shoulder is adapted, when the two parts are assembled together to be forced against the inclined face 27 of the lining 16.

In the particular example above described the taper 24 has an angle of 20° and the taper of the surface 15 of the inner member 10 is 16°. The surface 18a has an angle of 45° and the surface 18 is parallel with the surface 15 and therefore has an angle of 16°.

The armour clamping member of the gland (see FIGURE 3) is also of tubular form and is hexagonal for a portion of its length as indicated at 29. The bore of the member 28 is screw threaded internally at 30 so that it can be screwed onto the thread 21 of the part 19, after which the bore of member 28 tapers inwardly at 31 for a further portion of its length and then assumes a cylindrical form at 32.

As a preliminary step, to passing a cable through the gland, above described, the lining 16 of the part 10 and the bore 25 of the part 19, if they are not already of a size to receive the cable as a sliding fit, are bored out to suit the size of the cable.

The cable to be passed through the gland, assuming it is of the armoured type, is prepared as follows:

Firstly the clamping member 28 is threaded onto the cable.

The outer braiding or other covering is then stripped back and removed to expose a length of the armouring. The latter is then removed for a portion of its length so as to expose the lead, P.V.C., or other sheath of the cable the remaining exposed armouring being splayed outwardly. A portion of the lead, P.V.C., or other sheath is then removed to expose the separate conductors which of course will be stripped of insulation at their ends as necessary for connection to the apparatus within, for example, the casing on which the part 10 is mounted.

The outer member 19 is now threaded onto the cable sheath and its tapered part 22 located underneath the splayed out armouring.

The lead, P.V.C., or other sheath is then inserted an appropriate distance through the lead-lined bore of the inner member 10 after which the outer member 19 is screwed onto the said member 10 until its hexagonal flange 20 comes up against the hexagonal flange 11. In doing this the tapered socket 24 of the member 19 acts on the tapered spigot part 15, 18 of the inner part 10 and said part 15, 18 is crimped or contracted. At the same time the inclined face 27 of the lining 16 is compressed by the internal shoulder 26 of the outer part 19. Thus, the lining 16 in the neighbourhood of said crimp, is closed firmly onto the sheath of the cable to provide a secure and moisture-proof joint therewith. The internal obtuse angled undercut or cut-back 18, 18a in conjunction with the reduction in diameter at 14 and the inclined face 27, tend to cause the lead lining to close so as to make good surface contact with the sheath of the cable as indicated in chain lines in FIGURE 1 in a slightly exaggerated form so far as the degree of closing-in of the lining is concerned.

The clamping member 28 is then screwed onto the member 19 so that the splayed out armouring becomes effectively clamped between the tapered face 22 and the tapered face 31.

In applying the invention to a gland for a cable which has, for example, a lead, P.V.C., V.I.R., or similar sheath but no armouring, although it may have a fire resistant braiding, the member 28 is not of course required and then the gland comprises merely the parts shown in FIGURES 1 and 2. Where it is definitely not intended that the gland should be used with armoured cables then the screw thread 21 on the part 19 may be omitted.

The part of the member 19 having the bore 25 and providing the shoulder 26 may, instead of being formed integrally with said member, be constituted by a lead lining similar to the lead or like lining 16 of the part 10.

The lining 16 and the lining of the part 19, if such lining is provided, may be of a readily fusible metal (e.g. tinman's solder) which, by the application of heat after the cable has been passed through the gland, can be caused to fuse onto the lead sheath of the cable.

The gland shown in FIGURES 4 and 5 comprises an inner member 33 and an outer member 34. The inner member 33 has a tapered spigot part 35 formed with a relatively sharp edge 36 whilst the outer part 34 has a tapered socket 37. The inner part 33 is screw threaded at 38 and the part 34 has a screw thread 39 by which it can be screwed onto the thread 38. When this is done the tapered socket 37 crimps the tubular spigot 35 and causes the edge 36 to bite or dig into or contract onto the sheath of the cable passing through the gland so as to provide the required moisture-proof joint. This embodiment of the invention is similar in many respects to that already described with reference to FIGURES 1, 2 and 3 and may incorporate a lead lining and an additional element or member for clamping cable armouring to the part 34 in which case the latter will be formed with a tapered portion similar to the tapered portion 22 of the part shown in FIGURE 2.

The embodiment of the invention shown in FIGURE 6 is also similar to that already described with reference to FIGURES 1, 2 and 3 and where applicable like reference numerals have been used to designate like parts. The gland shown in FIGURE 6, however, is more particularly applicable to cables having armouring of the basket-weave or like type. In this case, therefore, the tapered portion 22 of the inner member 19 is replaced by a pair of split-collet members 40 which are clamped onto the armouring of the cable, so as to secure it to the gland, by screwing the clamping member 28 onto the member 19 of the gland. The surface of the tapered part 22 of the member 19 may be knurled or otherwise roughened as may also be the outer surface 15 of the member 10.

When a lead or other soft metal lining 16 is used the inner member 10 may terminate at the end of the screw threads 13 and the lining 16 enlarged to the same diameter and profile, as, to take the place of, the tapered face 15. The outer tapered face of the lining should be mechanical or otherwise finished so that it mates accurately with the tapered face 24 of the outer member 19.

A sealing pot may be formed on or secured to one of the gland members.

I claim:

In combination with an electric cable, a gland comprising two tubular members having cooperating screw threads whereby they are screwed together one within the other, the inner of said members having at its forward end, as an integral part of it, a continuous sleeve which is formed externally with a narrow circumferential groove to reduce its diameter locally to a material extent and beyond said groove is formed with an externally tapered portion having a plane surface, the interior surface of said sleeve having a circumferential groove of obtuse angular form which is inclined radially outwardly and forwardly for a portion of its width from a plane passing through said external groove and then radially inwardly and forwardly for the rest of its width up to the forward end of said inner member, the inner member also having secured within it a lining of soft material which extends from end to end of said member and fills the interior groove of obtuse angular form, the outer of said members having internally a tapered part with a plane surface which by the action of screwing the two members together acts on the tapered sleeve part of the inner member so as to contract said sleeve part and bring the soft lining into surface contact over a substantial circumferential area with the cable.

References Cited in the file of this patent

UNITED STATES PATENTS

| | | |
|---|---|---|
| 1,321,929 | Loetzer | Nov. 18, 1919 |
| 1,801,171 | Mueller et al. | Apr. 14, 1931 |
| 1,872,536 | Weatherhead | Aug. 16, 1932 |
| 1,959,079 | Holt | May 15, 1934 |
| 2,377,891 | Lave | June 12, 1945 |
| 2,477,969 | Donner | Aug. 2, 1949 |
| 2,496,510 | Wolfram | Feb. 7, 1950 |
| 2,503,826 | Lamont | Apr. 11, 1950 |
| 2,541,141 | Woodling | Feb. 13, 1951 |
| 2,567,639 | Fulton | Sept. 11, 1951 |
| 2,857,176 | McTaggart | Oct. 21, 1958 |

FOREIGN PATENTS

| | | |
|---|---|---|
| 723,967 | Germany | Aug. 14, 1942 |
| 666,157 | Great Britain | Feb. 6, 1952 |
| 776,890 | Great Britain | June 12, 1957 |